United States Patent [19]

Walsh

[11] 4,145,797

[45] Mar. 27, 1979

[54] METHOD AND APPARATUS OF MAKING LADDERS FOR VENETIAN BLIND ASSEMBLIES

[75] Inventor: Arthur W. Walsh, Virginia Beach, Va.

[73] Assignee: International Blind Company, Chester, Pa.

[21] Appl. No.: 819,851

[22] Filed: Jul. 28, 1977

[51] Int. Cl.[2] ............ G01B 11/04

[52] U.S. Cl. ............ 29/24.5; 33/127

[58] Field of Search ............ 29/24.5, 417, 509, 243.56, 29/243.57; 33/127, 136, 132 R, 86; 222/43; 227/150, 151, 154, 19, 140

[56] References Cited

U.S. PATENT DOCUMENTS

| | | | |
|---|---|---|---|
| 2,418,515 | 4/1947 | Lewis | 29/24.5 |
| 2,546,435 | 3/1951 | Fine | 33/127 X |
| 2,703,447 | 3/1955 | Rosenbaum | 33/127 X |
| 2,803,065 | 8/1957 | Anderle | 29/24.5 |
| 3,406,601 | 10/1968 | Clifford | 33/132 X |

*Primary Examiner*—Horace M. Culver
*Attorney, Agent, or Firm*—Eugene E. Renz, Jr.

[57] ABSTRACT

Method and apparatus for forming ladders for venetian blind assemblies comprised of elongated spaced vertical cords and a plurality of longitudinally spaced transverse cross pieces extending between the cords. The apparatus includes a frame, a ladder guide mechanism at one end of the frame including means for spacing the cords apart. Adjacent the guide mechanism is a gathering block having an opening through which the cords engage in close side-by-side relation. Adjacent and downstream of the gathering block is stapling means for securing the vertical cords together. Further downstream of the stapling station is measuring means in the form of an elongated measuring stock or tape so that as the ladder material is advanced through the apparatus, the operator may position the front end at a selected point along the measuring tape and make a visual determination of the of the desired length of a given ladder assembly. The apparatus further includes a stop mechanism in the form of a pin operable between a retracted position permitting free movement of the ladder through the apparatus and an extended position preventing said movement by engagement with one of the cross pieces. The stop mechanism is actuated to an extended position when the desired length has been achieved to permit cutting of the cords adjacent the stapling station. At this point the stop mechanism is then moved to retracted position and the ladder stock advanced to form the next ladder.

9 Claims, 10 Drawing Figures

METHOD AND APPARATUS OF MAKING LADDERS FOR VENETIAN BLIND ASSEMBLIES

BACKGROUND OF THE INVENTION

The present invention relates to venetian blind assemblies and more specifically to novel method and apparatus for forming the ladders supporting the slats in these assemblies.

Conventional venetian blind assemblies usually comprise a head rail mounted in the top section of a window opening or the like, a plurality of horizontally oriented vertically spaced slats supported in ladders adjacent their outer terminal ends, and a bottom rail to which the lower end of the ladders are connected. The head rail houses control mechanisms for raising and lowering the slats as well as means including a tilt control bar for changing the angular attitude of the slats. The ladders are secured to the tilt control rod at their upper ends in some cases by looping the ladder around the tilt control rod. Venetian blinds of this general type are shown in Walker U.S. Pat. Nos. 2,663,368 and 2,892,493 and Rau U.S. Pat. No. 3,180,400. As illustrated in these prior patents, the ladders usually comprise a pair of vertical or upright cords which at their upper ends may be looped or otherwise secured to the tilt control rod and a series of transverse vertically spaced cross pieces or rungs on which the slats rest. Some of these ladder assemblies are of the so called "string" type wherein the side pieces are braided cords and each cross piece is a plurality of filaments which may be braided or twisted into one or more strands. The present invention is adapted particularly for making ladders of this type.

The stock material for these string type ladders is usually available in a long continuous length which the manufacturer of the blind assembly cuts to a given length depending on the type and size blind assembly. After cutting lengths from the ladder stock the upper ends of the vertical strings are then secured and at least two or three of the cross pieces adjacent the top are trimmed in the manner shown in FIG. 1 of the drawings to allow for looping around the tilt control rod. The bottom terminal ends of the vertical cords are attached to a bottom rail by means of a fastening button or the like. Preparation of the ladders heretofore has been done manually which of course is somewhat time consuming and expensive. The string type ladder is particularly difficult to handle because it is so delicate and the cords and cross pieces tend to tangle and twist in handling from the stock material.

SUMMARY OF THE INVENTION

With the above in mind, it is an object of the present invention to provide a method and apparatus for automating the manufacture of ladders which significantly decreases the time required to form the ladders from the coil stock and which eliminates some of the other problems inherent with the manual operation. The apparatus essentially comprises a supply station including a cartridge for the ladder stock, a guide member through which the ladder stock is guided which is operable to maintain the vertical strings in a predetermined separated position, a gathering or clinching die adjacent the discharge end of the guide wherein the vertical cords are positioned in close proximity to be stapled together at a stapling station adjacent to and downstream of the gathering die. Further downstream of the gathering die there are a series of guide blocks and rollers through which the stock is passed to a measuring table. Measuring means in the form of a scaled tape on the table is provided to measure the length from the clinching anvil or stapling station so that the operator can visually determine the length of the ladder to be formed.

One of the features of the present invention is the provision of a stop or locating pin which, in the present instance, is solenoid operated and which is normally retracted out of the path of the ladder stock to permit free passage through the apparatus and which may be selectively positioned in the path of the transverse rungs when the desired length is achieved and locks the ladder stock against further displacement by the operator. In this position the operator actuates the stapling head to clinch the stock at the desired length. The solenoid is then deenergized to retract the pin which permits the stock to be further drawn along the table. The operator then cuts the vertical strings behind the staple and advances the ladder stock to measure the next piece to be formed.

The apparatus further includes a safety panel normally shielding the stapling area positioned relative to a master switch so that the stapling head can only be operated with the panel in a protective position. The panel is pivotally mounted so that it may be selectively moved to expose the stapling area for initially threading the ladder stock in the apparatus. In this position the master switch is open to close power to the stapling head.

BRIEF DESCRIPTION OF THE DRAWINGS

These and other features of the present invention will be hereinafter more fully set forth and become more apparent as they are hereinafter more fully set forth with reference to the accompanying drawings, wherein.

DESCRIPTION OF A SPECIFIC EMBODIMENT

Figures 1, 2, 3, 4, 5:
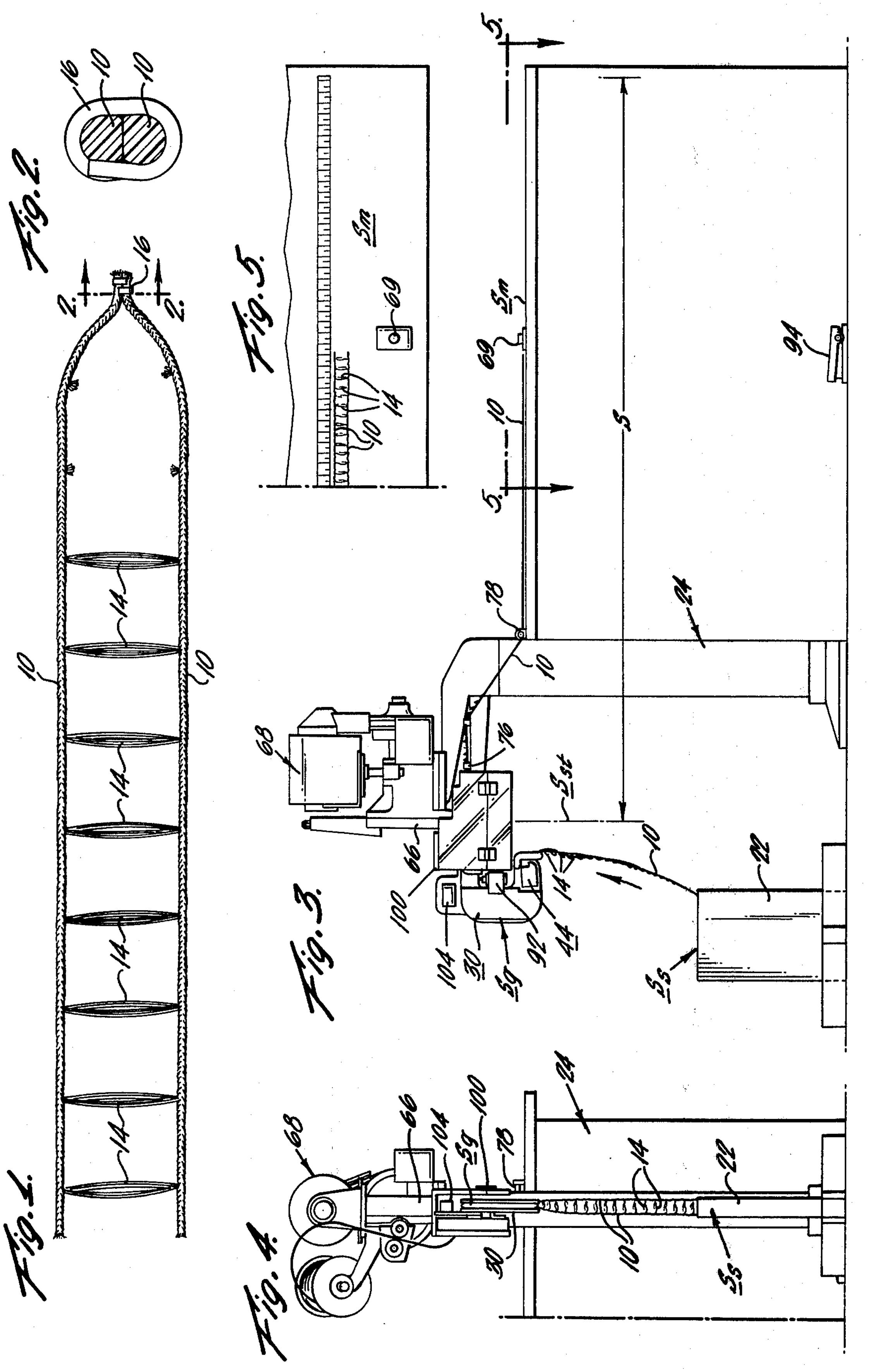
FIG. 1 is a view of a ladder produced by method and apparatus in accordance with the present invention.
FIG. 2 is an enlarged sectional view through the upper terminal end thereof showing the staple clinching the terminal ends of the vertical cords of the ladder.
FIG. 3 is a side elevational view of apparatus in accordance with the present invention.
FIG. 4 is an end view thereof.
FIG. 5 is a fragmentary plan view of the table top taken on lines 5—5 of FIG. 3.
Figure 10:
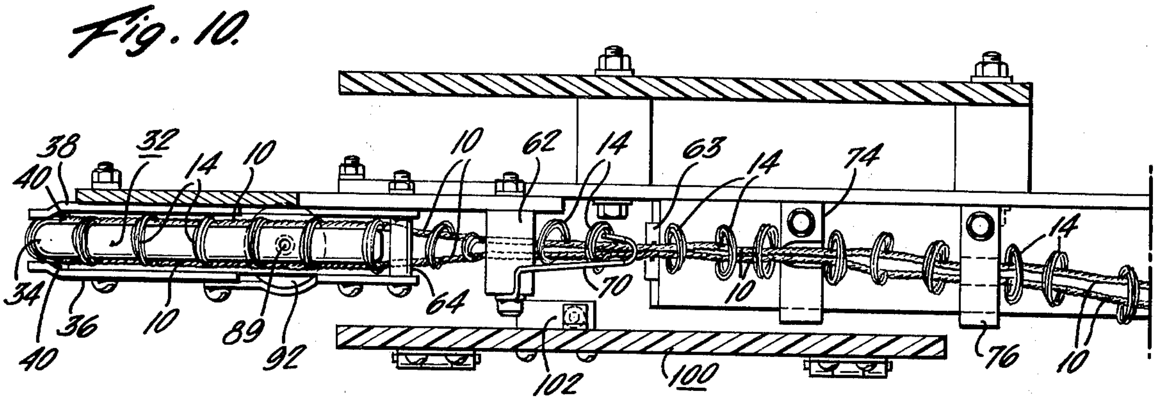
FIG. 10 is a top plan view showing some of the details of the guide elements including the gathering block and anvil for the staple head.

Referring now to the drawings, there is illustrated in FIGS. 1 and 2 a ladder formed by method and apparatus in accordance with the present invention. The ladder is of the "string" type including a pair of vertical cords or side pieces 10, 10 which as noted above may be braided cords and a plurality of rungs or cross pieces 14 which extend between the vertical cords and are longitudinally spaced apart to support the slats for the venetian blind assembly. The upper end of the ladder which in this case is designed to be looped around the tilt control rod is secured together by a staple 16. In this instance, the two rungs adjacent the upper end of this ladder are trimmed to allow for looping the ladder around the tilt control rod. The lower terminal end of the cords 10, 10 are adapted to be secured to the bottom rail of a venetian blind assembly in the manner illustrated in a pending application entitled, VENETIAN BLIND ASSEMBLY AND MOUNTING MEANS THEREFOR, Ser. No. 798,649, filed May 19, 1977.

The general details of apparatus for forming ladder strings of the type described above in accordance with the present invention is best shown in FIGS. 3 and 4. Considering broadly the apparatus in terms of function and with reference to the primary component elements and their respective functions, the stock material for the ladders is housed in a cartridge 22 at a supply station $S_s$. The ladder stock is fed along a predetermined path through the apparatus including first a guide station $S_g$ located at one end of the main frame 24 which spreads the vertical cords 10, 10 and positions the rungs 14 around an arcuate portion of the guide. At the discharge end of the guide section $S_g$, the vertical cords 10, 10 are drawn together in close side by side relation by means of a gathering block 26 at a prestapling station $S_p$. The side by side cords are then moved over an anvil at the stapling station $S_{st}$ where the vertical cords are clinched together by a staple. A measuring station $S_m$ including an elongated table having a measuring scale is located downstream of the stapling station $S_{st}$ to aid the operator in visually determining when the ladder stock has been advanced sufficiently to form a ladder of the desired length. The scale is graduated and marked in a manner to take into account various offsets in the path of the stock material.

An important feature of the present invention is the provision of means for intermittently preventing movement of the ladder stock along the path including a stop pin selectively actuatable by the operator to be positioned in the path of the transverse rungs when a given length of the ladder stock has been measured. With the pin in this position and movement through the apparatus is temporarily blocked by the pin, the operator actuates the stapling head to secure the vertical cords in the manner described above. Other features include a deflector element adjacent the stapling station to maintain the stapling area clear of any rungs during the application of the staple to the vertical cords.

Considering briefly the operation of the apparatus, the operator initially feeds the ladder stock through the various stations to set up the machine. With the ladder stock in the machine as illustrated in FIG. 4, the operator simply pulls the outer end of the stock to a selected position on the measuring scale for the particular length of ladder desired and then actuates the stop pin mechanism which prevents further advance of the ladder stock through the machine. The staple is applied and thereafter the operator disengages the pin to permit the ladder stock to be advanced through the apparatus. He then cuts the vertical cords behind the staple and manually trims two or three of the rungs adjacent the staple to complete a ladder. The sequence is then repeated to form the next ladder.

The method essentially consists of the steps of advancing ladder stock along a predetermined path including separating the vertical cords at a guide station, gathering the vertical cords in close adjacent side by side relation downstream of the guide station, securing the gathered vertical cords at a stapling station and intermittently restraining movement of the stock along the path when a predetermined desired length for a ladder is reached.

Figure 6:
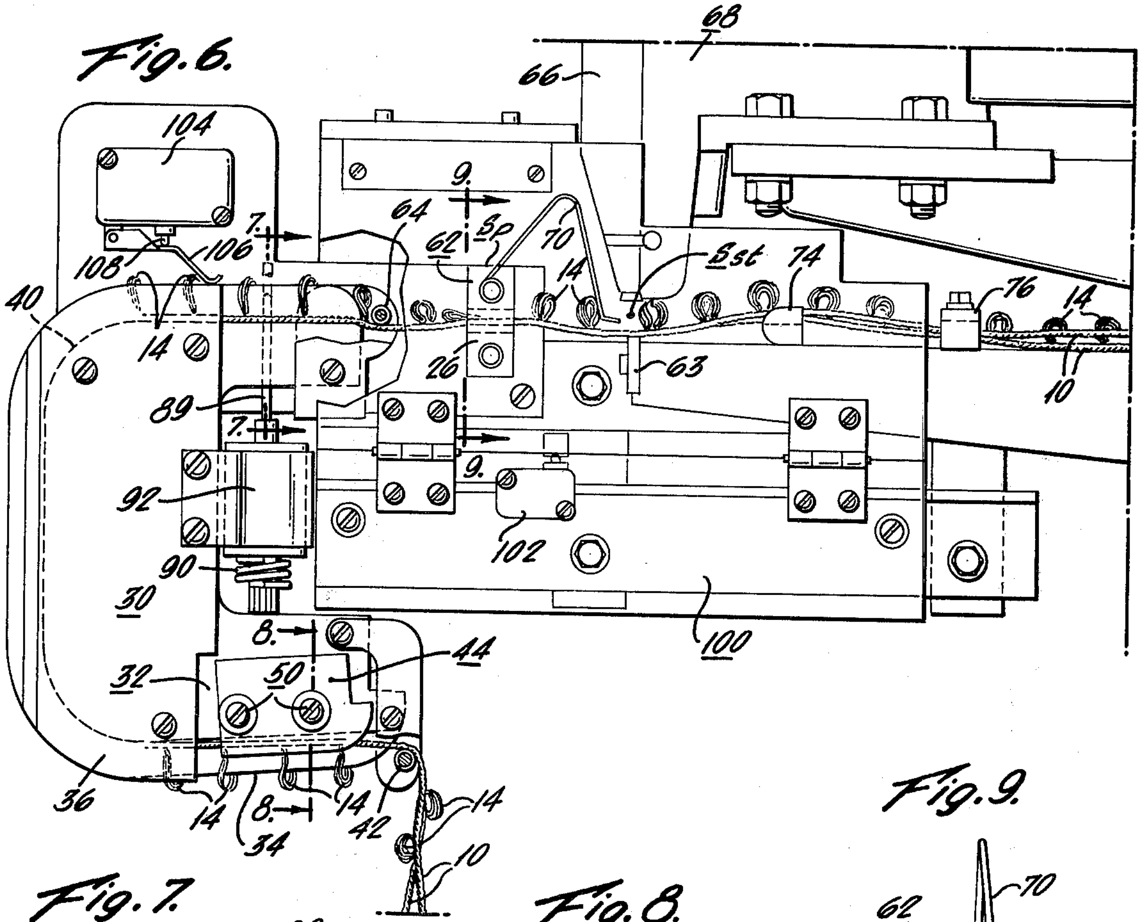
FIG. 6 is an enlarged side elevational view showing the guide system and the stapling station of the apparatus.
Figure 7:
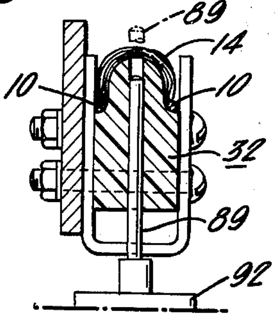
FIGS. 7, 8 and 9 are enlarged sectional views taken on lines 7—7, 8—8 and 9—9 respectively of FIG. 6.
Figure 8:
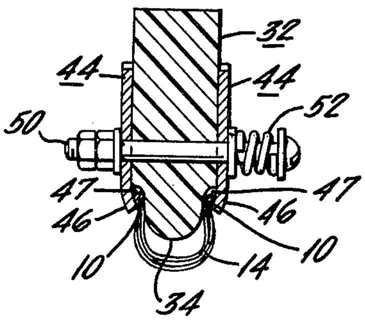
Figure 9:
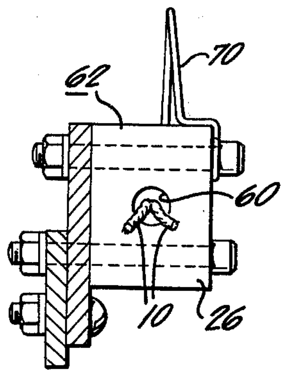

Turning now to the specific structural details and arrangement of the apparatus and considering first the ladder guide assembly 30, the assembly comprises a guide rail 32 of generally C-shaped configuration. The rail 30 has a contoured outer face 34 of generally semi-spherical cross section which with side plate 36 and 38 forms a pair of spaced guide channels 40, 40 separating the vertical cords. As illustrated, the transverse rungs are engaged over the contoured section of the rail. This spreads the rungs and prevents entanglement as the ladder is actuated through other sections of the machine in the manner described below. As shown in FIG. 6, the ladder stock initially passes over a guide roller 42 at the entrance end of the guide rail 32, the roller 42 being supported on brackets. A pair of guide plates 44, 44 are mounted on either side of the rail at the entrance end. These guide plates have inwardly curved edges 46 adjacent the contoured section of the rail to confine the cords 10, 10 in guide channels 47 in the manner illustrated in FIG. 8. The guide plates 44 are mounted for limited lateral displacement to facilitate initial positioning of the cords in the guide channels 47. In the present instance, this displacement action is provided by a pair of bolts 50 which pass through the guide plates and rail and include a coil spring 52 between the head and a washer fitted up against one of the guide plates. By this arrangement the plates are easily moved outwardly against the bias of the springs to initially thread the ladder stock in the guide channels. The ladder stock is then laid over a vertical portion and upper arm of the C-shaped guide rail and then fed through the central opening 60 of a gathering block 62 disposed adjacent the upper discharge end of the guide rail. Note that the cords 10, 10 pass under a roller 64 as they leave the discharge end of the guide rail before entering the gathering block 62. A staple anvil 63 is positioned closely adjacent the gathering block 62 in vertical alignment with the head 66 of a conventional wire stapling machine 68. Actuation of the stapling head to apply a staple is controlled by switch 69 located on the table top. A deflector 70 of inverted V-shape is mounted between the gathering block 62 and anvil 63 and serves to prevent the transverse rungs from interfering with the stapling operation. Downstream of the stapling station, the stock material passes over and under a pair of guide blocks 74 and 76 and then deflects downwardly under a roller 78 to the measuring table.

One of the features of the present invention is the provision of stop means selectively actuatable by the operator when a desired ladder length has been determined and which is operable between an extended position in the path of the transverse rungs to prevent actuation of the ladder stock through the apparatus during the stapling cycle and a normally retracted position out of the path of the transverse rungs to permit normal feed of the stock through the machine. In the present instance, stop means is in the form of a pin 89 located adjacent the discharge end of the guide rail which engages through an opening therein. As shown in FIG. 6, the pin is normally biased to a retracted position by spring 90 and is extended against the bias of the spring on energization of a conventional solenoid 92 controlled by a foot control switch 94 located under the table within easy access of the operator.

The apparatus also includes a transparent safety cover 100 which normally prevents access to the stapling station $S_{st}$. This shield which may be made of plastic is normally in a vertical position once the machine has been threaded to engage a master switch 102 which controls the operation of the stapling machine. The cover 100 may be pivoted outwardly which in turn opens the switch 102 preventing operation of the stapler.

Inventory control means in the form of counter 104 of conventional design is provided in the system which as best illustrated in FIG. 6 includes a pivotally mounted feeler arm 106, the tip of which normally contacts the guide rail and upon passage of a transverse rung thereunder is pivoted upwardly to pulse or actuate counter pin 108. Since the loops are uniformly spaced apart, the counter readout can obviously be converted to show lineal footage of ladder string through the machine. If desired, the counter can be operatively tied in with the stop mechanism and the stapling machine by suitable conventional electrical circuit means to provide for automatic operation of the stop means and the stapling machine in the sequence described above. In this instance, the counter may be provided with a selective dial which the operator sets for a given desired length of ladder to be formed and since the loops are tied in with lineal length of the ladder string, when a given predetermined number of loops have passed under the feeler arm, the counter through its circuity will effect simultaneous cycling of the stop pin to an extended position and actuation of the stapling heast to apply the staple.

Thus, while the invention has been described with particular reference to specific embodiments thereof, it will be understood that it may be embodied in a variety of forms diverse from those specifically shown and described, without departing from the spirit and scope of the invention as defined by the appended claims.

What is claimed is:

1. Apparatus for forming ladders for venetian blind assemblies comprised of elongated spaced vertical cords and a plurality of longitudinally spaced transverse cross pieces extending between the cords comprising a frame, a ladder guide mechanism at one end of the frame including means for spacing the chords apart, a gathering block adjacent the guide mechanism having an opening through which the cords engage in close side by side relation, means located adjacent the gathering block for securing the vertical cords, means for measuring the distance between the securing and measuring means so that the length of a given ladder assembly may be visually determined and a stop mechanism operable between a retracted position to permit free movement of the ladder string through the apparatus and an extended position preventing said movement.

2. Apparatus as claimed in claim 1 wherein said guide mechanism comprises a C-shaped guide bar having a guide portion of generally semi-spherical cross section which together with a pair of side plates defines spaced channels for the vertical cords of the ladder material.

3. Apparatus as claimed in claim 3 including a pilot section comprised of a pair of side plates adjustably mounted relative to the C-shaped guide rail to permit lateral displacement thereby facilitating threading of the ladder string in the guide assembly.

4. Apparatus as claimed in claim 1 including a deflector disposed between the gathering block and stapling anvil operable to constrain the rungs and keep them out of the stapling area during the cycling of the stapling head.

5. Apparatus as claimed in claim 1 including a pivotally mounted safety panel operable between a first position preventing access to the stapling area of the machine and a second open position to permit threading of the ladder material and including master switch means normally closed when the protective shield is in said first position and open in said second position to prevent operation of said stapling head.

6. Apparatus as claimed in claim 1 wherein said stop mechanism includes a stop pin disposed adjacent said guide mechanism and operable between an extended position in the path of the transverse cross pieces and a retracted position out of the path thereof.

7. An apparatus as claimed in claim 1 wherein said securing means comprises a stapling mechanism.

8. Apparatus as claimed in claim 1 wherein said measuring means comprises an elongated measuring tape disposed downstream of said securing means.

9. A method for forming ladders for venetian blind assemblies comprised of elongated vertical cords and a plurality of longitudinally spaced transverse cross pieces extending between the cords consisting of the steps of advancing the ladder material along a predetermined path including a guide station wherein the vertical cords are spaced apart, feeding the ladder material along said predetermined path while gathering the vertical cords in close side-by-side relation at a prestapling station, inserting stop means between the cross pieces to facilitate sizing and cutting ladders of a predetermined length, securing the vertical cords at a stapling station and trimming the cords behind the staple to form the finished ladder.

* * * * *